United States Patent
Martin

(10) Patent No.: US 8,200,172 B2
(45) Date of Patent: Jun. 12, 2012

(54) LOOK-UP TABLE FOR CONTROL OF POWER OUTPUT FROM FM TRANSMITTERS

(75) Inventor: Demian Martin, San Leandro, CA (US)

(73) Assignee: Monster Cable Products, Inc., Brisbane, CA (US)

( * ) Notice: Subject to any disclaimer, the term of this patent is extended or adjusted under 35 U.S.C. 154(b) by 769 days.

(21) Appl. No.: 12/182,483

(22) Filed: Jul. 30, 2008

(65) Prior Publication Data

US 2010/0029231 A1 Feb. 4, 2010

(51) Int. Cl.
*H04B 1/04* (2006.01)
*H04B 7/00* (2006.01)
(52) U.S. Cl. .................. 455/127.1; 455/91; 455/522
(58) Field of Classification Search .................. 455/522, 455/91, 103, 115.1, 139, 150.1, 113, 127.1
See application file for complete search history.

(56) References Cited

U.S. PATENT DOCUMENTS

| | | | |
|---|---|---|---|
| 6,091,343 A * | 7/2000 | Dykema et al. | 340/825.69 |
| 6,426,675 B1 * | 7/2002 | Salzmann | 330/129 |
| 6,710,651 B2 * | 3/2004 | Forrester | 330/129 |
| 7,224,215 B2 * | 5/2007 | Osborn | 330/2 |
| 7,936,228 B2 * | 5/2011 | Komori et al. | 332/119 |
| 2009/0253459 A1 * | 10/2009 | Naganuma et al. | 455/556.1 |

* cited by examiner

*Primary Examiner* — Sonny Trinh
(74) *Attorney, Agent, or Firm* — LaRiviere, Grubman & Payne, LLP

(57) ABSTRACT

A system and method for optimizing the performance of RF devices having a transmitter and an antenna that function at multiple frequencies. Due to regulatory limits on radiation output, and because antenna gain varies with frequency, transmitter power has been constrained by the highest efficiency point of the antenna. According to the present invention, the optimal power setting is empirically determined for each frequency, and stored in a data table. When an operational frequency is selected for the RF device, the data table is consulted to determine the appropriate power setting for the transmitter.

2 Claims, 5 Drawing Sheets

Hypothetical Data Table

| Frequency | Power Setting |
|---|---|
| 88-90 MHz | +2 dB |
| 90-96 MHz | +1 dB |
| 96-106 MHz | 0 dB |
| 106-108 MHz | +1dB |

Figure 3

LOOK-UP TABLE FOR CONTROL OF POWER OUTPUT FROM FM TRANSMITTERS

BACKGROUND OF THE INVENTION

In recent years, there has been a rapid proliferation of radio frequency (RF) devices. In diverse arenas such as communications, security, audio/video, home and vehicular use, and beyond, the desire for wireless technologies has spurred the development of many products that utilize radio frequency transmitters.

Examples of the growth in technology in this field include U.S. patent application Ser. No. 11/531,018 for a "Method and Apparatus for Identifying Unused RF Channels," and U.S. patent application Ser. No. 11/690,747 for an "FM Transmitter for an MP3 Player." The disclosures of these patent applications are herein incorporated by reference.

The radiation output of radio frequency devices is limited by local regulatory law. In the United States, for example, RF devices are regulated by the Federal Communications Commission, whose rules are codified in Sections 2, 4, 5, 15, and 18 of Title 47 of the Code of Federal Regulations. For example, RF devices operating in the FM radio spectrum are regulated by Section 15.239, in which "intentional radiators" operating in the 88-108 Mhz frequency band are limited to a field strength of 250 microvolts/meter at 3 meters within a 200 kHz band centered on the operating frequency.

RF devices typically include both an RF transmitter and an attached antenna. In such devices, RF transmitter power must be adjusted so that when transmission occurs in combination with the antenna, the overall radiation output of the RF device does not exceed the legal limits. If the RE device is capable of operation at multiple frequencies, then RF transmitter power must be set so that radiation output is compliant for all operating frequencies. Because antenna gain varies with frequency, prior art devices have complied with radiation output limits by setting RF transmitter power to the maximum allowable at the operational frequency at which antenna gain is the highest (i.e. the frequency at which antenna efficiency is greatest). However, this means that for all other operational frequencies, radiation output is compromised, as radiation output necessarily falls below the legal limit due to the antenna's lower efficiency at these other frequencies. Thus, prior art devices fail to maximize radiation output throughout their range of operating frequencies.

The present invention solves the aforementioned problems in the prior art by providing a system and method whereby radiation output is maximized within allowable limits for all operational frequencies regardless of variation in antenna gain across the operational frequency range.

SUMMARY OF THE INVENTION

The present invention is drawn to a system and method for optimizing RF transmission power of RF devices across multiple frequencies in view of regulatory limits on radiation output. According to the present invention, in an RF device having an RF transmitter and an antenna, the maximum allowable RF transmitter power is empirically determined at each operational frequency. The resulting data points form a table that is stored in the device's memory. When the device is operated at a given frequency, the table is consulted to determine the appropriate power setting for the RE transmitter at that frequency. In this manner, the RE device produces the maximum allowable signal strength in compliance with regulatory law regardless of the operating frequency and the efficiency characteristics of the antenna, thereby giving the user the best performance possible.

BRIEF DESCRIPTION OF THE DRAWINGS

For a better understanding of the present invention, reference is made to the below-referenced accompanying drawings. Reference numbers refer to the same or equivalent parts of the present invention throughout the several figures of the drawings.

FIG. 3 is an example of a table of power output settings for a frequency range, in accordance with an embodiment of the invention.

DESCRIPTION OF THE EMBODIMENTS

The present invention is drawn to a system and method for maximizing the output of an RF device across its entire operational frequency range.

Figure 1:
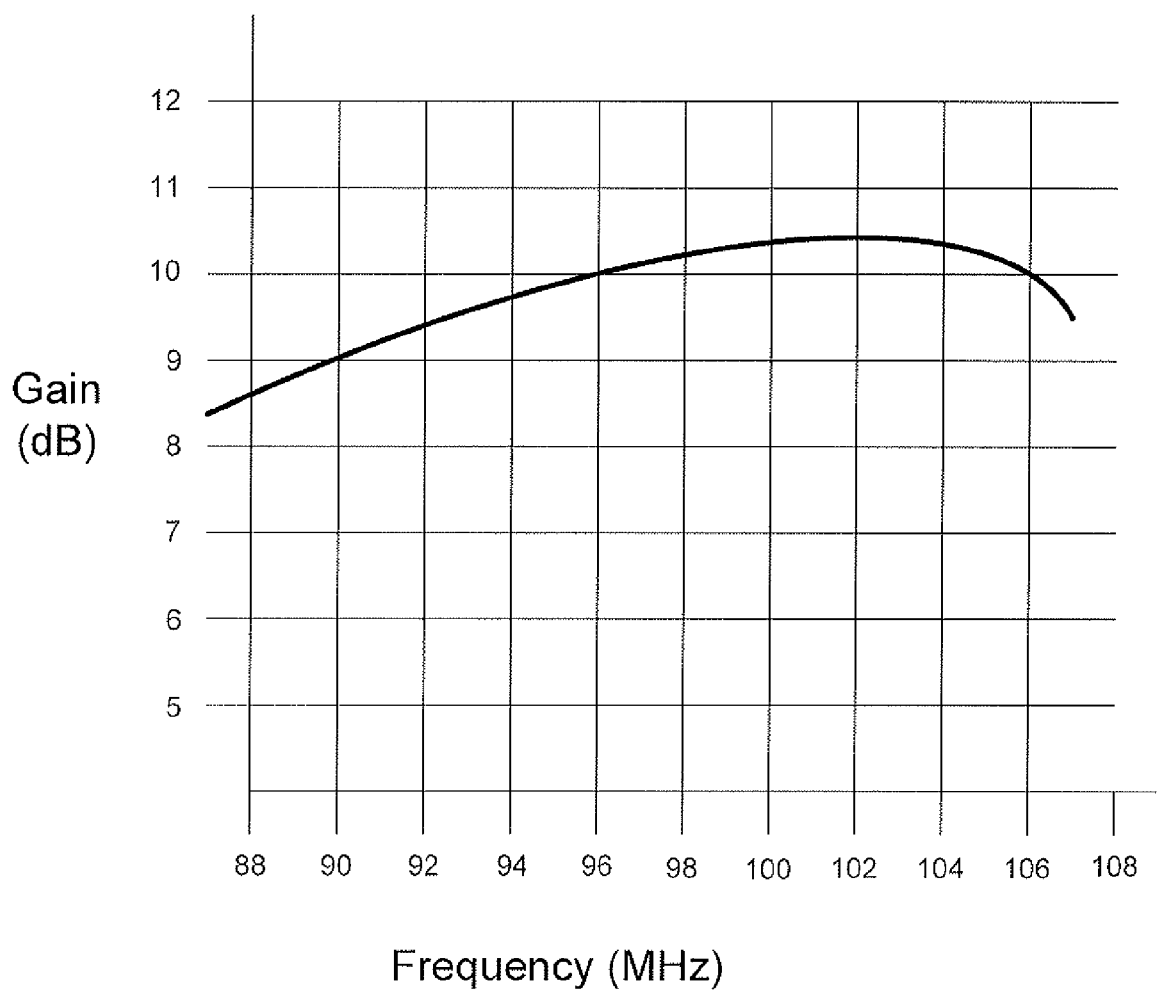
FIG. 1 is a graph of antenna gain vs. frequency for a hypothetical RE antenna.

FIG. 1 is a graph of antenna gain vs. frequency for a hypothetical antenna. According to the graph, the antenna's maximum gain occurs at approximately 102 MHz. At this frequency, the antenna is operating at its peak efficiency. When the antenna is conventionally used in conjunction with a radio transmitter, the transmitter must be adjusted to maximize power output relative to regulatory limits at this frequency. If power output were to be maximized at some other frequency, then the device would likely exceed the regulatory limit on radiation output when operated at the maximum gain frequency.

Figure 2:
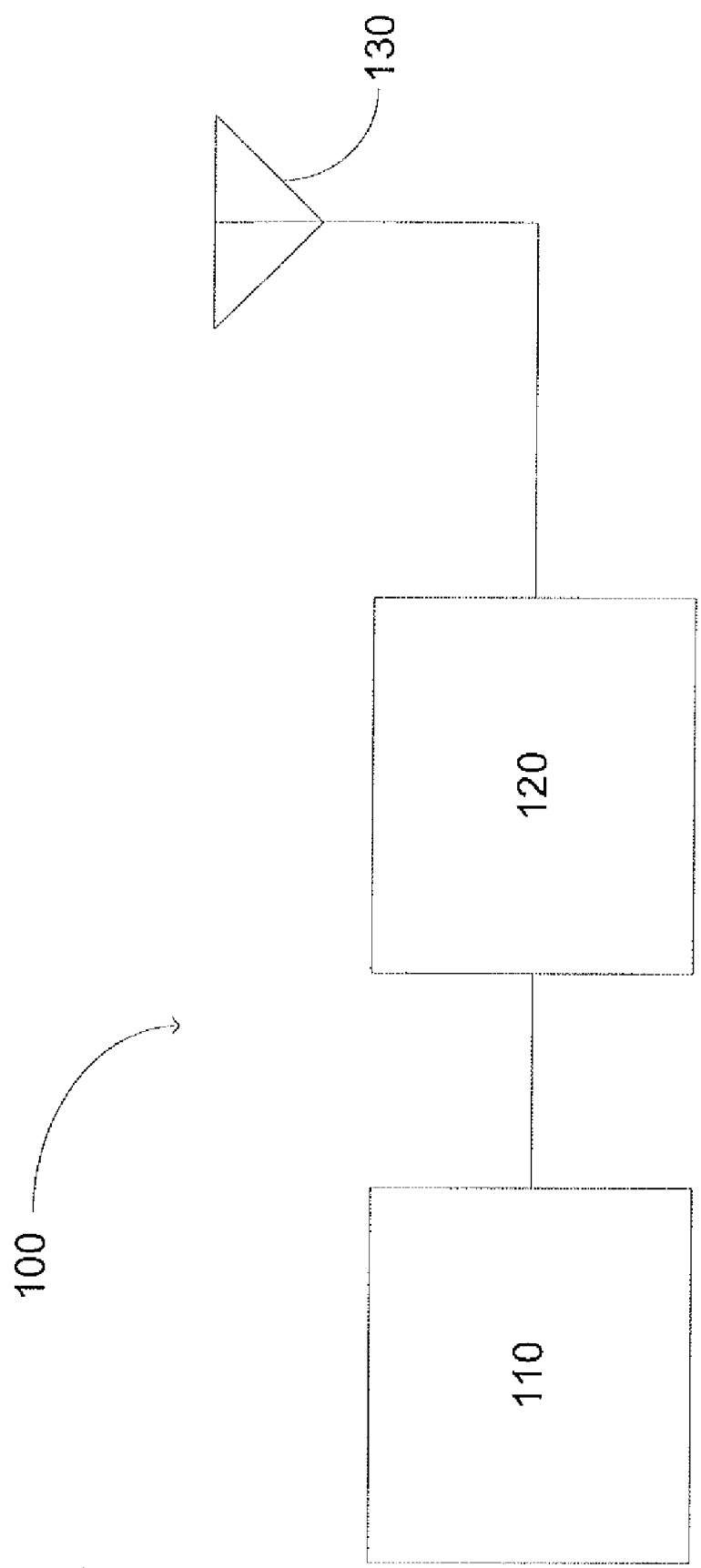
FIG. 2 is an illustration of an RF device in accordance with an embodiment of the invention.

With reference to FIG. 2, an RF device 100 is shown in accordance with an embodiment of the present invention. RF device 100 produces RF radiation and is capable of operation at more than one frequency. Device 100 includes a controller 110, a transmitter 120, and an antenna 130. Antenna 130 may be any antenna design known in the art, and is coupled to transmitter 120. Transmitter 120 generates an RF signal, and is capable of adjusting both the frequency and power of the signal. An example of a transmitter is the Silicon Laboratories Si4712, which has programmable transmission levels in 1 dB increments. The controller 110 is coupled to transmitter 120, and contains memory and a microprocessor for providing a control signal to transmitter 120, and may also receive user input commands.

In normal use, controller 110 receives input from a user (not shown) setting the frequency of operation. In the alternative, the frequency of operation may be automatically determined by the controller 110 according to a method such as that disclosed in U.S. patent application Ser. No. 11/531,018. The controller 110 then determines the appropriate power setting for the transmitter 120 corresponding to the selected operational frequency, so that the radiation output of device 100 is maximized in accordance with the regulatory limit.

In the preferred embodiment of the invention, a data table consisting of each possible frequency of operation and its corresponding power setting is stored in memory in controller 110. Thus, controller 110 determines the appropriate power setting for a particular frequency by consulting the stored data table. In alternative embodiments of the invention, the power setting can be calculated in real time based on the frequency of operation and the gain of antenna 130.

The controller 110 sends a control signal to the transmitter 120 that contains both the frequency of operation and corresponding power setting. The transmitter then produces the RF signal accordingly, which is output via the antenna 130. The radiation output of the device 100 is thus maximized in view of that allowable by law, regardless of the frequency of operation and the performance characteristics of the antenna 130.

By way of example only, a hypothetical data table as described above is illustrated in FIG. 3 for the hypothetical antenna with characteristics as disclosed in FIG. 1. The antenna has a peak gain in the range of 96-106 MHz. It is assumed for the sake of example only that the applicable transmitter is adjustable in 1 dB increments, and that the transmitter is set to 0 dB throughout the 96-106 MHz range, this setting corresponding to a radiation output that is maximized in conjunction with the antenna in accordance with the regulatory limit. In the 90-96 MHz and 106-108 MHz ranges, the antenna gain is approximately 1 dB less than the peak gain. Therefore the power setting for these frequency ranges is increased to +1 dB. In the 88-90 MHz frequency range, the antenna gain is approximately 2 dB less than the peak gain. Therefore the power setting for this frequency range is further increased to +2 dB.

A transmitter capable of finer adjustment of its power setting would facilitate the application of different power settings to more specific frequency ranges. This would yield better maximization of radiation output throughout the total frequency range. The power setting is provided in dB for convenience and ease of understanding, and may in fact be an arbitrary scale that is representative of the variability of the power output of the transmitter.

Figure 4:
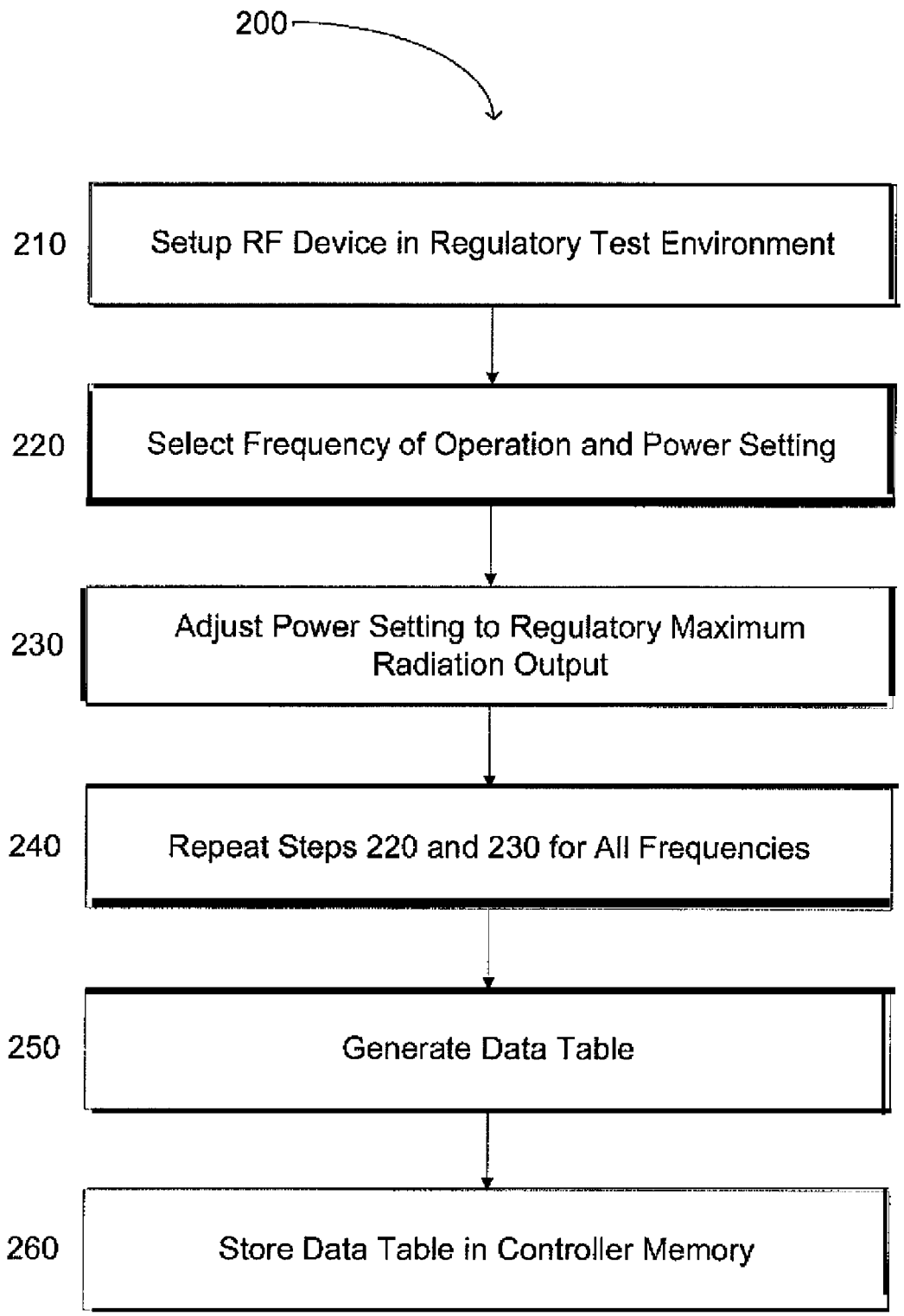
FIG. 4 is a flow diagram illustrating a method for determining the optimized power settings for an RF device, in accordance with an embodiment of the invention.

With reference to FIG. 4, a method 200 is illustrated as a flow diagram for determining the optimized power settings for an RF device having an RF transmitter, and an antenna. At step 210, the RF transmitter and antenna are situated in a regulatory test environment for measuring radiation output. Under section 15.31 of Title 47 of the Code of Federal Regulations, the FCC conducts testing for compliance using procedures defined in ANSI C63.4-2003: "Methods of Measurement of Radio-Noise Emissions from Low-Voltage Electrical and Electronic Equipment in the Range of 9 kHz to 40 GHz."

At step 220, a frequency of operation and power setting for the RF transmitter is selected, and a measurement taken of the resulting radiation output. At step 230, the power setting is adjusted until the resulting measured radiation output matches the regulatory maximum allowable. At step 240, the procedures of steps 220 and 230 are repeated for each possible frequency of operation. At step 250, a data table is generated containing each possible frequency of operation and a corresponding power setting that maximizes radiation output of the RF device. At step 260, the data table is stored in memory in the controller.

Figure 5:
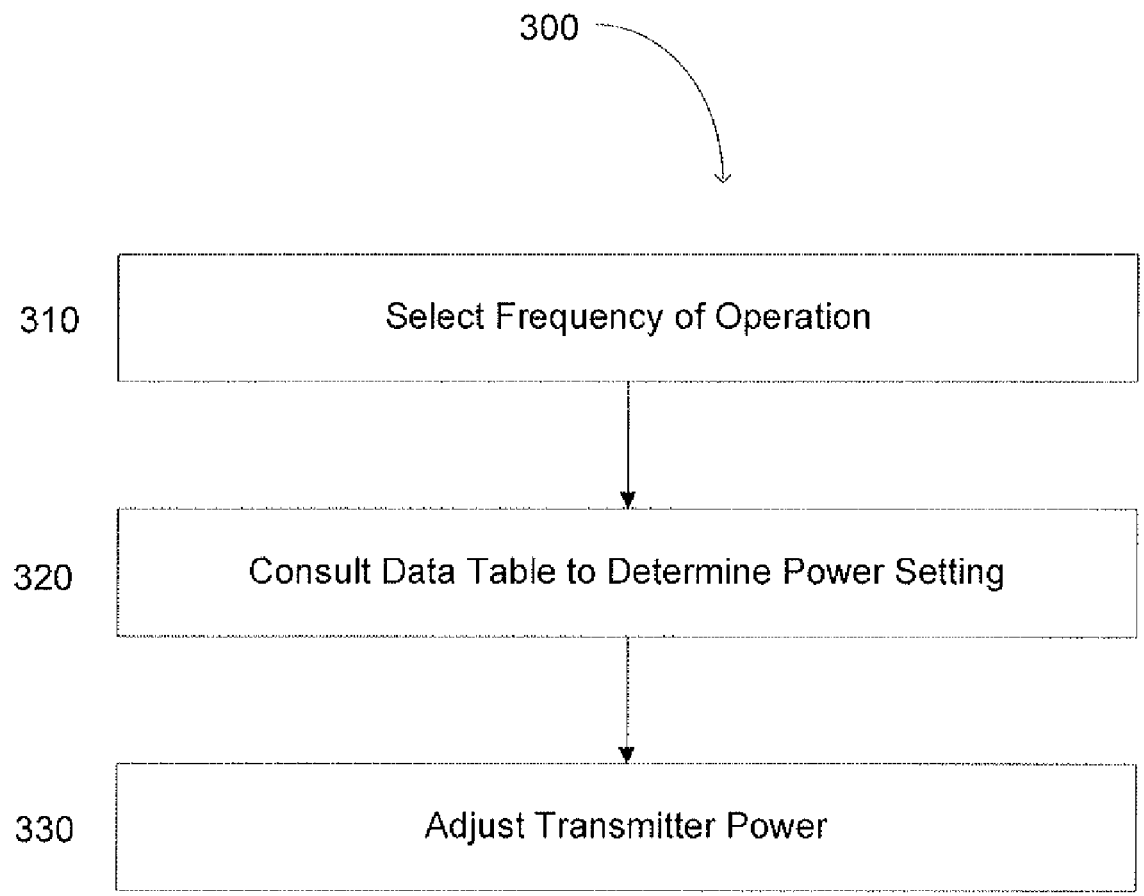
FIG. 5 is a flow diagram illustrating a method for optimizing the performance of an RF device, in accordance with an embodiment of the invention.

With reference to FIG. 5, a method 300 is illustrated as a flow diagram for optimizing the performance of an RF device having an RF transmitter and an antenna, and utilizing a data table containing appropriate power settings to maximize the output of the RF transmitter for each possible frequency of operation.

At step 310, a frequency of operation is selected for the RF device. At step 320, the data table is consulted to determine the power setting corresponding to the selected frequency that maximizes the radiation output of the RF device subject to regulatory limits. At step 330, the RE transmitter is set to emit at the chosen frequency and power setting.

Information as herein shown and described in detail is fully capable of attaining the above-described object of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, in which reference to an element in the singular is not intended to mean "one and only one" unless explicitly so stated, but rather "one or more."

All structural and functional equivalents to and combinations of the elements of the above-described preferred embodiment and additional embodiments that are known to those of ordinary skill in the art are hereby expressly incorporated by reference and are intended to be encompassed by the present claims. However, it should be readily apparent to those of ordinary skill in the art that various changes and modifications in form, apparatus material, and fabrication material detail may be made without departing from the spirit and scope of the invention as set forth in the appended claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. No claim herein is to be construed under the provisions of 35 U.S.C. §?112, sixth paragraph, unless the element is expressly recited using the phrase "means for."

The invention claimed is:

1. A radio frequency (RF) device for transmitting RF signals at multiple operating frequencies the RF device having:
   a. an RF transmitter for the generation of RF signals;
   b. an antenna for improving the efficiency of transmission of the RF signals, the antenna being coupled to the RF transmitter;
   c. a memory storage component comprising a data table containing values for the maximum allowable radiation output for RF transmitters at each operating frequency that are within legal limits;
   d. a controller coupled with said memory storage component for adjusting the frequency and power output of the RF transmitter, wherein for each operating frequency, the output of the RF transmitter is automatically adjusted so as to maximize the overall radiation output of the RF device within legal limits.

2. A method of transmitting the maximum radiation output of an RF device in accordance with legal limits, the RF device having an RF transmitter for generating an RF signal and an antenna coupled to the RF transmitter for increasing the efficiency of transmission, wherein the RF device transmits RF signals at multiple operating frequencies the method comprising the following steps:
   a. determining applicable operating frequencies of transmission;
   b. determining the maximum radiation output settings for the applicable operating frequencies within legal limits for the RF transmitter by consulting a data table stored in a controller memory containing the values for these settings; and
   c. Transmitting the RF signals at the maximum radiation output settings within legal limits.

* * * * *